(12) United States Patent
Zhou et al.

(10) Patent No.: US 8,923,640 B1
(45) Date of Patent: Dec. 30, 2014

(54) COHERENCE GROUPS: REGION DESCRIPTORS FOR LOW BIT RATE ENCODING

(71) Applicant: Apple Inc., Cupertino, CA (US)

(72) Inventors: Xiaosong Zhou, Campbell, CA (US); Hsi-Jung Wu, San Jose, CA (US); Chris Y. Chung, Sunnyvale, CA (US); Albert E. Keinath, Sunnyvale, CA (US); David R. Conrad, Sunnyvale, CA (US); Yunfei Zheng, Cupertino, CA (US); Dazhong Zhang, Milpitas, CA (US); Jae Hoon Kim, San Jose, CA (US)

(73) Assignee: Apple Inc., Cupertino, CA (US)

( * ) Notice: Subject to any disclaimer, the term of this patent is extended or adjusted under 35 U.S.C. 154(b) by 35 days.

(21) Appl. No.: 13/913,169

(22) Filed: Jun. 7, 2013

(51) Int. Cl.
*G06K 9/62* (2006.01)
*H04N 19/583* (2014.01)

(52) U.S. Cl.
CPC ............................ *H04N 19/00733* (2013.01)
USPC ...................................................... 382/238

(58) Field of Classification Search
USPC ................................................ 382/232–238
See application file for complete search history.

(56) References Cited

U.S. PATENT DOCUMENTS

| | | |
|---|---|---|
| 2012/0219055 A1 | 8/2012 | He et al. |
| 2013/0016783 A1 | 1/2013 | Kim et al. |
| 2013/0051452 A1 | 2/2013 | Li et al. |

*Primary Examiner* — Duy M Dang
(74) *Attorney, Agent, or Firm* — Kenyon & Kenyon LLP

(57) ABSTRACT

The invention is directed to an efficient way for encoding and decoding video. Embodiments include identifying different coding units that share a similar characteristic. The characteristic can be, for example: quantization values, modes, block sizes, color space, motion vectors, depth, facial and non-facial regions, and filter values. An encoder may then group the units together as a coherence group. An encoder may similarly create a table or other data structure of the coding units. An encoder may then extract the commonly repeating characteristic or attribute from the coding units. The encoder may transmit the coherence groups along with the data structure, and other coding units which were not part of a coherence group. The decoder may receive the data, and utilize the shared characteristic by storing locally in cache, for faster repeated decoding, and decode the coherence group together.

37 Claims, 5 Drawing Sheets

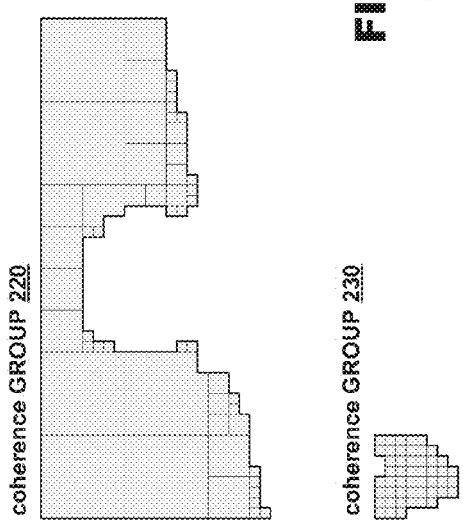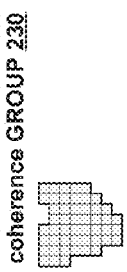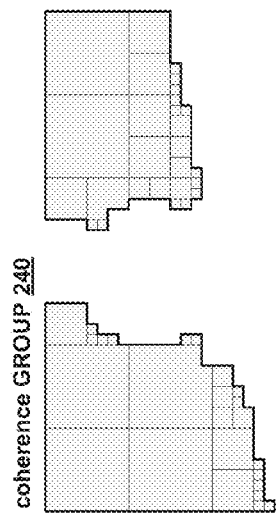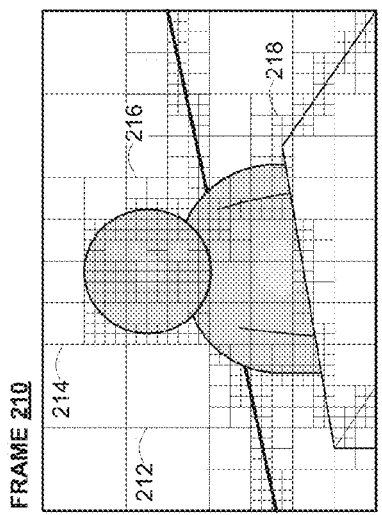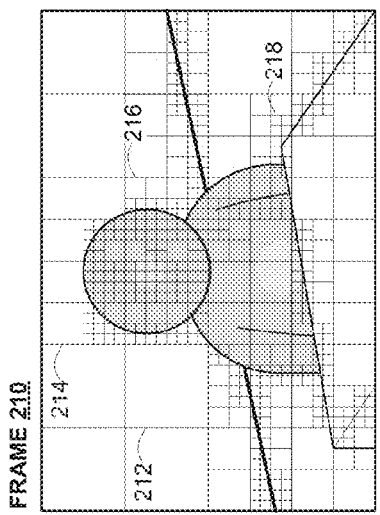
FIG. 2
200

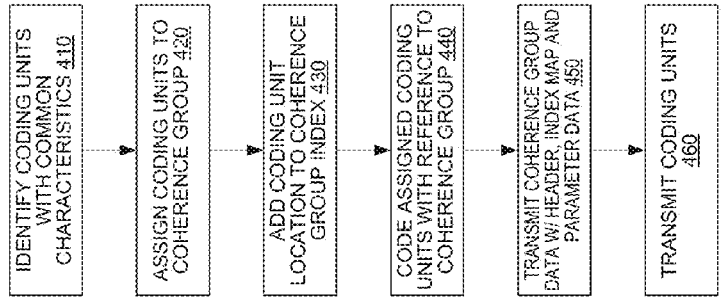
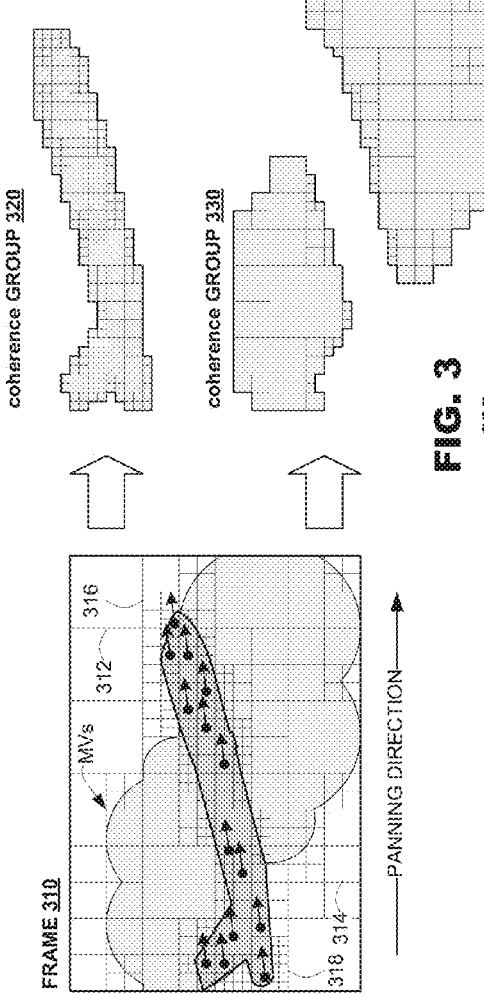

700

800

COHERENCE GROUPS: REGION DESCRIPTORS FOR LOW BIT RATE ENCODING

BACKGROUND

In video coding systems, a conventional encoder may code a source video sequence into a coded representation that has a smaller bit rate than does the source video and, thereby achieve data compression. A decoder may then invert the coding processes performed by the encoder to retrieve the source video.

Modern block-based encoders tessellate spatial regions into non-overlapping coding units which are encoded atomically albeit they are coded in relation to neighboring coding units. This scheme presents several issues. First, for large coherent regions, block-based encoders incur signaling per coding unit, and rely on entropy coding (usually performed in some form of raster-scan ordering of the coding units) to reduce signaling overhead. Additionally, for bit streams that exhibit temporal correlation over a large spatial region, there is a computational overhead incurred by the encoders/decoders as they process one coding unit at a time. Thus, block-based encoders can lose some of the efficiencies that otherwise can be achieved when coding large temporally-correlated image information.

The inventors perceive a need in the art for a block-based coding protocol that permits efficient coding of temporally-correlated image information in source video.

BRIEF DESCRIPTION OF THE DRAWINGS

FIGS. 2-3 illustrate coherence groups for an exemplary frame of video, according to an embodiment of the present invention.

FIG. 4 is a flow diagram illustrating a method according to an embodiment of the present invention.

DETAILED DESCRIPTION

An enhanced video coding and decoding algorithm is described that may search in a video frame, or sequence of frames for repeating coding units which share a coding characteristic or attribute. The coding units may be grouped together as a coherence group. A packing method and syntax are explained which enable the transport of this novel video packing format. Furthermore, decoding methods to capitalize on the more efficient data packing and streaming are explained which may utilize the reduced data redundancy by reusing the shared characteristic by caching it for fast access.

Figure 1:
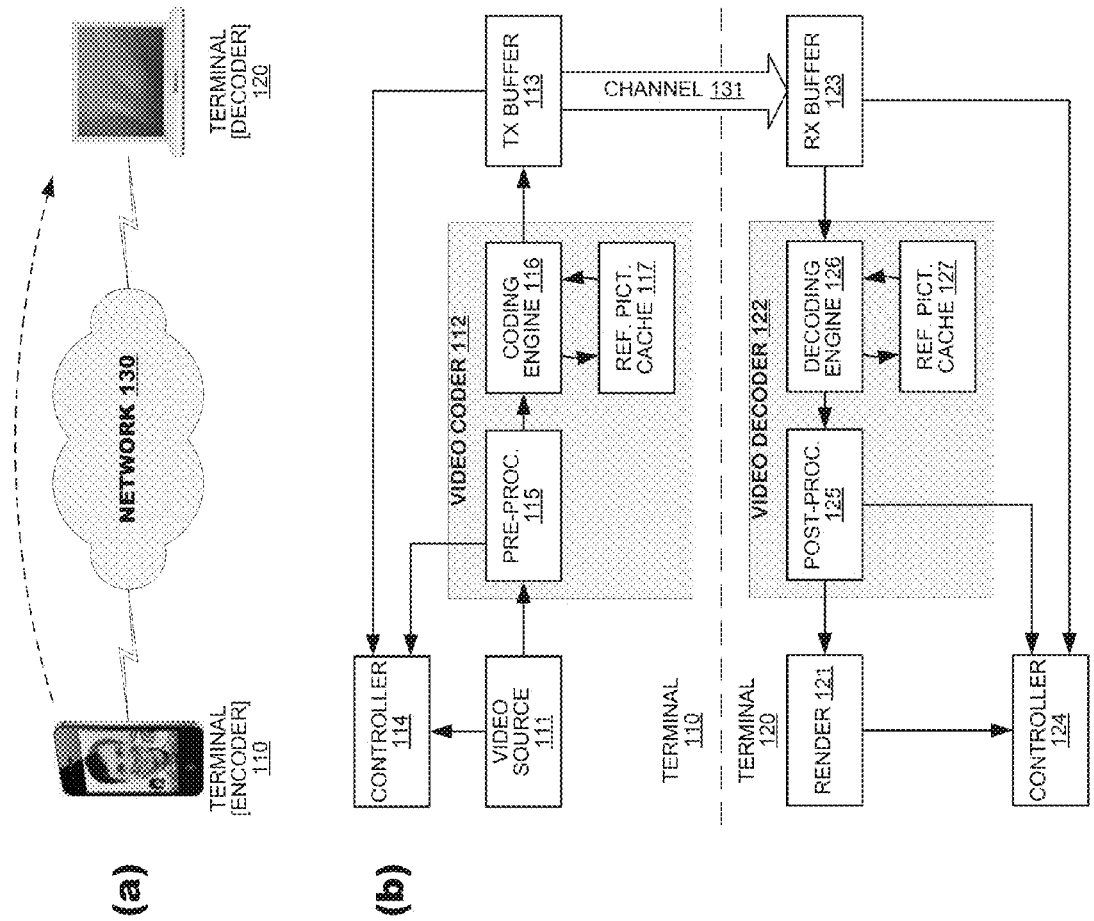
FIG. 1 is a simplified block diagram of an exemplary video coder/decoder system suitable for use with the present invention.

FIG. 1 is a simplified block diagram of an encoder/decoder system 100 according to an embodiment of the present invention. The system 100 may include first and second terminals 110, 120 interconnected via a network 130. The first terminal 110 may include an encoder that may generate video data representing locally-captured image information and may code it for delivery over the network 130. The network 130 may deliver the coded video to a second terminal 120, which may include a decoder to recover. Some coding protocols involve lossy coding techniques, in which case, the decoder 120 may generate a recovered video sequence that represents an approximation of the source video. Other coding protocols may be lossless, in which case, the decoder 120 may generate a recovered video sequence that replicates the source video. In either case, the decoder 120 may output the recovered video sequence for local viewing.

In FIG. 1, the encoder 110 and decoder 120 may be provided within a variety of computing platforms, including servers, personal computers, laptop computers, tablet computers, smart phones, media players and/or dedicated video conferencing equipment. The network 130 represents any number of networks that convey coded video data among the encoder 110 and decoder 120, including, for example, wireline and/or wireless communication networks. A communication network may exchange data in circuit-switched and/or packet-switched channels. Representative networks include telecommunications networks, local area networks, wide area networks and/or the Internet. For the purposes of the present discussion, the architecture and topology of the network 130 is immaterial to the operation of the present invention unless explained hereinbelow.

The encoder 110 may include a video source 111, a video coder 112, a transmit buffer 113 and a controller 114. The video source 111 may generate the video sequence for coding. Typical video sources 111 include cameras that generate video from locally-captured image information and storage devices or screen buffers (not shown) in which video may be stored, e.g., for media serving applications. The video coder 112 may code frames of video data according to different coding modes. The transmit buffer 113 may store coded video data as it is output by the video coder 112 and awaiting transmission via the network 130. The controller 114 may manage communication of video data to a decoder 120 over a network channel.

The decoder 120 may include a rendering unit 121, a video decoder 122, a receive buffer 123 and a controller 124. These components may invert coding operations performed by the encoder 110. The receive buffer 123, for example, may store the received data, may parse the data into component data streams and may forward coded video data to the decoding engine 122. The decoding engine 122 may invert coding processes applied by the coding engine 112 and generate decoded video therefrom. The decoding engine 122 may output the recovered video data to the rendering unit 121 for consumption. The rendering unit 121 may be a display, a storage device or scaler (not shown) to which recovered video data may be output.

As shown, the video coder/decoder system 100 supports video coding and decoding in one direction only. For bidirectional communication, an encoder and decoder may each be implemented at each terminal 110, 120 such that each terminal may capture video data at a local location and code the video data for transmission to the other terminal via the network. Each terminal may receive the coded video data of the other terminal from the network, decode the coded data and display video data recovered therefrom.

FIG. 1 illustrates a simplified functional block diagram of a video encoder 112 according to an embodiment of the invention. The video encoder 112 may include a pre-processor 115, a coding engine 116 and a reference picture cache 117. The pre-processor 115 may perform statistical analyses of frames received from the video source 111 for use in parsing the frames into coding units and, perhaps, filtering the video data. The coding engine 116 may code the video data according to a predetermined coding protocol. The coding engine 116 may output coded data representing coded pictures, as well as data representing coding modes and parameters selected for coding the pictures, to a transmit buffer 113 for output to a channel 131. The reference picture cache 117 may store decoded data of reference pictures previously coded by the coding engine 116; the picture data stored in the reference picture cache 117 may represent sources of prediction for later-received pictures input to the video encoder 112.

FIG. 1 also illustrates a simplified functional block diagram of a video decoder 122 according to an embodiment of the invention. The video decoder 122 may include a post-processor 125, a decoding engine 126 and a reference picture cache 127. The decoding engine 126 may decode coded video data according to the coding operations performed by its counterpart in the video coder 112. The decoding engine 126 may output decoded data to the post-processor 125 and to the reference picture cache 127. The reference picture cache 127 may store decoded data of reference pictures output by the decoding engine 126; the picture data stored in the reference picture cache 127 may represent sources of prediction for later-received coded pictures input to the video decoder 122. The post-processor 125 may perform filtering operations on frames received from the decoding engine 126 prior to outputting the decoded video data to a rendering unit 121.

During operation, the preprocessor 113 may parse input frames into different "coding units" for processing by the coding engine 116. Coding units respectively may represent groups of pixels of various sizes. For example, a coding unit may include a 4×4, 8×8, 16×16 or 32×32 sized array of pixel data. Further, pixel data may be parsed into color component data prior to being processed by the coding engine 116. Moreover, a frame may be parsed into coding units of different sizes prior to being processed by the coding engine 116.

Embodiments of the present invention may build a coding artifact, called a "coherence group" herein, for video coding. A coherence group may include multiple coding units that share coding properties such that a coding engine 112 determines they can be grouped together into a common syntactic element to conserve bandwidth. The coding units may, for example, share common motion properties, quantization parameters, prediction references, coding objects or other properties that can be represented together. By presenting coding data representing these shared characteristics in a common syntactic element, the encoder may conserve bandwidth in a communication channel 130.

As part of its processing, an encoder 110 may search input video data for common characteristics that can be coded in a coherence group. The encoder 110 may search for such characteristics at various points during its operation, for example, searching input data that has yet to be coded, searching again among the input data after prediction references have been selected, searching again after coding has been applied to input data and (optionally) revising prior coding selections to take advantage of additional coding efficiencies that might be achieved by adding other coding units to a coherence group. For example, the coherence group can be a group of coding units with shared characteristics, such as:

Motion vectors;
Coding mode assignments (e.g., intra-coding, inter-coding, skip coding and merge mode coding) applied to the coding units;
Sizes of the coding units;
Gradients among video data, which may identify regions of smooth image data, video data that contacts edges or regions of video data that contact textures;
Changes among gradients in video data, which also may identify regions of smooth image data, video data that contacts edges or regions of video data that contact textures;
Coding unit complexity in a spatial domain;
Coding unit complexity in a temporal domain;
Correlation among coding units and, further, a direction of correlation among the coding units;
A distinction between nature video content and computer-generated video content;
A distinction between video content that is classified as a facial region and content that is a non-facial region; and
Depth of video content, for example bit-depth and/or 3D depth.

The coherence group may be built from coding units of a single frame or, alternatively, from coding units of multiple frames. Still further, the coherence group can be formed of a group of coding units that incur similar processing complexities on decode.

A coherence group may include coding units of a single frame, coding units of multiple frames, coding units of multiple views in the case of stereoscopic video or coding units of multiple layers in the case of scalability-coded video. In embodiments where a coherence unit includes coding units from multiple frames, views or layers, the coherence group's index may include identifiers indicating the frame(s), view(s) or layer(s) to which each coding unit belongs, in addition to data identifying the coding units' locations.

In another embodiment, a coding syntax may be defined to include multiple levels of coherence groups. For example, the coding syntax may include provision for frame-level coherence groups that group video content of multiple frames together, syntax-level coherence groups that group video content of multiple slices together, and coding unit-level coherence groups.

Below, exemplary use cases for coherence group coding are presented.

FIG. 2 illustrates application of coherence groups to an exemplary frame 210 according to an embodiment of the present invention. The frame 210 is illustrated as having been parsed into a plurality of coding units according to image content within the frame. Each coding unit includes an array of pixels from the frame 210. Four sizes of coding units 212, 214, 216 and 218 are illustrated in the example of FIG. 2. Although the different coding units 212-218 are illustrated as squares, the principles of the present invention apply to coding units of different shapes (for example, rectangles).

Two coherence groups are illustrated in FIG. 2(a), groups 220 and 230. Coherence group 220 may be identified, for example, based on common motion characteristics that are observable in a video sequence to which the frame 210 belongs. In the illustrated example, the coding unit 220 corresponds to a background region of the image which may exhibit common motion properties to each other (which may be no motion, as the case may be). Alternatively, these "background" coding units may be identified if they exhibit common spatial complexity to each other. In either case, a video encoder may identify these common properties and assign coding units that have such properties to a common coherence group 220 for coding.

The second coding group 230 may be identified from object detection applied by a preprocessor. For example, a preprocessor may apply facial recognition processes to input video. When a facial region is identified, a controller may cause video data of the facial region to be coded at a higher coding quality than other regions, for example, the background. As part of this process, the controller may cause the video coder to parse the image data corresponding to the facial region into small-sized coding units and also may assign relatively lower quantization parameters to the coding units to preserve image fidelity. As part of this process, the controller may cause those coding units to be assigned to a coherence group 230 for coding.

FIG. 2(*b*) illustrates another coherence group 240 according to an embodiment of the present invention. In the illustrated example, background regions of the image may be allocated to a coherence group on the basis of image content within the regions' coding units, for example, spatial complexity, motion or the like. In the example of FIG. 2(*b*), the coherence group 240 is formed of coding units that are not contiguous within the spatial area of the frame 210. Thus, the principles of the present invention permit construction of a coherence group from non-contiguous regions of coding units.

FIG. 3 illustrates application of coherence groups to another exemplary frame 310 according to an embodiment of the present invention. Again, the frame 310 may be parsed into a plurality of coding units 312, 314, 316, 318 of various sizes according to image content within the frame 310. FIG. 3 again illustrates a pair of coherence groups 320, 330, which may be identified based on common characteristics among coding units. For example, coherence group 320 may be identified based on motion characteristics of content in the frame 310 which coherence group 330 may be identified based on spatial complexity of other image content of the frame 320 (in addition to or without regard to motion characteristics).

FIG. 4 is a flow diagram of a method 400 for creating a coherence group according to an embodiment of the present invention. The method 400 may be performed during coding of a new frame of video data. The method 400 may identify coding units from the frame which have similar characteristics to each other (block 410). When coding units are identified that have common characteristics, the coding units may be assigned to the coherence group (block 420) and location information identifying the assigned coding units may be added to an index that identifies the coding units that belong to the coherence group (block 430). The method 400 also may code the assigned coding units with reference to coding parameters that will be transmitted in the coherence group (block 440).

The method 400 may build a transmission sequence for the coherence group (block 450) that includes a header indicating the onset of the coherence group, an index map and parameter data that is to be applied during decoding of the coherence group. The method also may transmit the coding units that belong to the coherence group after transmission of the coherence group itself (block 460). In one embodiment, the assigned coding units may be transmitted immediately following transmission of the coherence group. In other embodiments, however, the assigned coding units may be transmitted in a transmission order determined by other factors, for example, in a raster scan order or in an order determined by a coding tree to which the coding units belong. In either case, coded data of the coding units may be coded differentially with respect to parameter data of the coherence group or, alternatively, simply may omit fields that correspond to parameter data presented in the coherence group.

Once an encoder signals coherence groups, there is no need, at each coding unit within the group, to signal redundant information. For example, once a motion vector group is signaled, motion vectors at each coding unit need not be signaled. Additionally, coding units within a coherence group can signal differences from the shared information. For example, a coding unit in a motion vector coherence group can signal a small motion vector difference from the shared motion vector. This still helps the processing, as relevant pixels for the small difference are likely to have been fetched along with the pixels of the rest of the coherence group.

Figure 5:
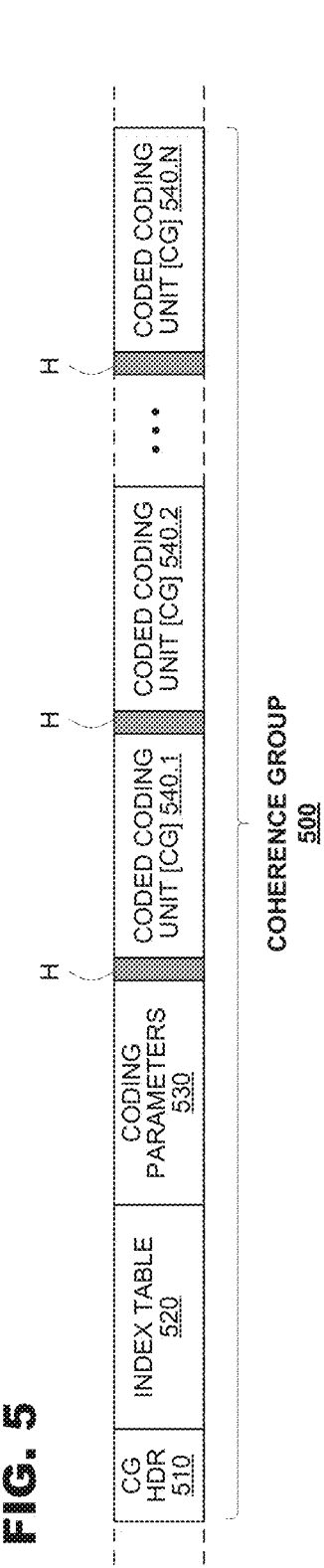
FIGS. 5-6 illustrate syntaxes for video transmissions according to embodiments of the present invention.

FIG. 5 illustrates a transmission sequence for a coherence group 500 according to an embodiment of the present invention. As indicated, the coherence group 500 may include a header field 510, an index table 520, a parameters field 530 and the coded coding units 540.1-540.N that belong to the coherence group. The header field 510 may include content that identifies the presence of the coherence group 500 within a larger coded video sequence. The index table 520 may include data that identifies which coding units in the frame are members of the coherence group 500. The parameters field 530 may include coding data that is common to the coded coding units 540.1-540.N of the coherence group 500. For example, the parameters field 530 may include data representing the coding units' motion vector, quantization parameter, coding mode, frequency distribution and/or either in-loop or out-of-loop filtering parameters, such as deblocking filter parameters and/or sample adaptive offset parameters. The coded coding units 510.1-540.N data may include other coded data of the coding units. In this regard, the coding unit data 540.1-540.N may include headers H to indicate the onset of the coding unit and other data from which a decoder may generate recovered video data of the coding unit.

In this embodiment, because the coded coding units 540.1-540.N of the coherence group appear in transmission order immediately following the coherence group header 510, index table 520 and coding parameters 530, it may be sufficient for the index table to identify a number of coding units that belong to the coherence group 500. A decoder may count the number of coding unit headers H that follow the coherence group's header 510 to identify the coded coding units 510.1-540.N that appear within the coding unit.

Figure 6:
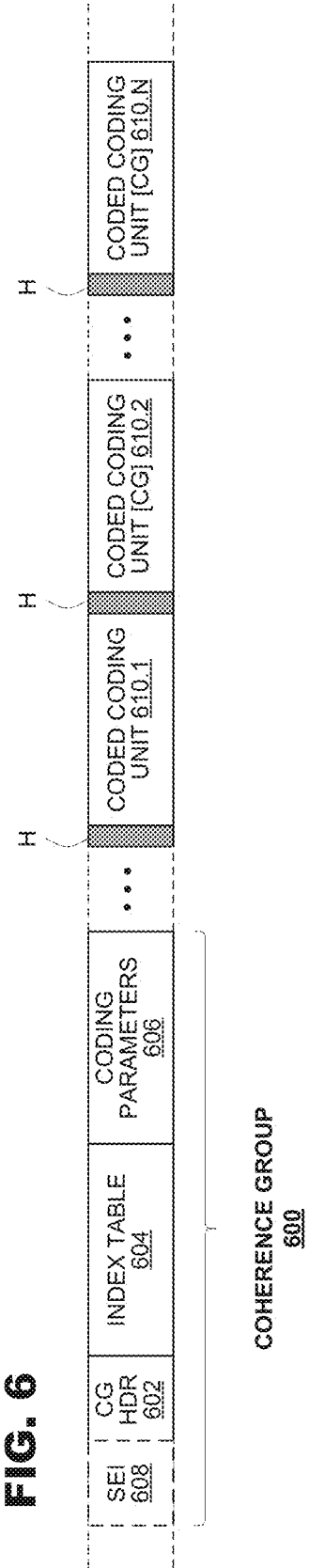

FIG. 6 illustrates a transmission sequence for a coherence group 600 according to another embodiment of the present invention. In this embodiment, the coherence group 600 may include a header field 602, an index table 604 and a parameters field 606. The header field 602 may include content that identifies the presence of the coherence group 600 within a larger coded video sequence. The index table 604 may include data that identifies which coding units in the frame are members of the coherence group 600. The parameters field 606 may including coding data that is common to the coding units of the coherence group 600. Again, the parameters field 606 may include data representing the coding units' motion vector, quantization parameter, coding mode, frequency distribution and/or deblocking filter parameters.

The transmission sequence may include coded data representing coding units 610.1-610.N of the frame, some of which may be members of the coherence group and others of which may not be members of the coherence group. In the example illustrated in FIG. 6, the coding units 610.2 and 610.N are illustrated as members of the coherence group (marked "[GC]" in the figure), whereas coding unit 610.1 is not. In this embodiment, the coded coding units may be provided in the transmission sequence according to a predetermined coding order, which may be determined by a coding tree, a raster scan or other protocol by which the encoder and decoder operate. As a decoder decodes a given coding unit, the decoder may determine with reference to the index table 604 whether the coding unit is a member of data may include other coded data of the coding units. In this embodiment, the index table may include identifier(s) of the coding units 610.2, 610.N that belong to the coherence group that can be compared to the coding units 610.1-610.N as they are received and decoded.

In implementation, it is expected that encoders and decoders will operate according to a predefined transmission protocol that codifies coherence groups in its syntax. For example, it may find application in the HEVC coding standard that, at the time of this writing, is under development as ISO/IEC 23008-2 MPEG-H Part 2 and ITU-T H.265. Coherence groups need not be codified in every case, however. In other implementations, for example, coherence group information may be embedded into supplemental enhancement information (SEI) messages, which allow definition of signaling that is out of scope for a governing protocol. Thus, in the embodiment illustrated in FIG. 6, the coherence group 600 is illustrated as embedded in an SEI message 608.

Figure 7:
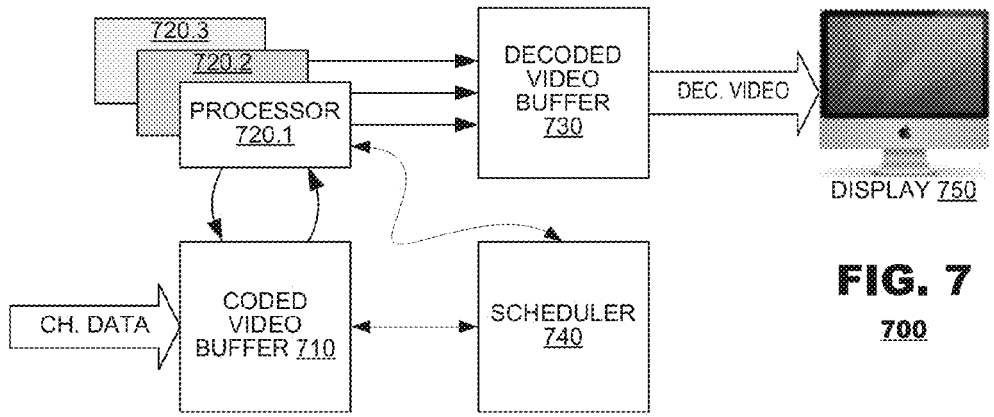
FIG. 7 is a functional block diagram of a video decoder according to an embodiment of the present invention.

Use of coherence groups can lead to resource conservation at decoders in various use cases. FIG. 7 illustrates one such use case using a multi-threaded decoder. FIG. 7 is a functional block diagram of a video decoder 700 according to an embodiment of the present invention in which the video decoder 700 includes a coded video buffer 710, a plurality of processors 720.1-720.3, a decoded video buffer 730 and a scheduler 740. The coded video buffer 710 may store coded video data from a channel. The scheduler 740 may review the coded video data and assign portions of the coded video data to be decoded by the processors 720.1-720.3. The processors 720.1-720.3 may decode the coded video data and store decoded video in the decoded video buffer 730. In so doing, the processors 720.1-720.3 each may perform operations described above in connection with the video decoder 122 (FIG. 1). The decoded video may be retrieved from the decoded video buffer 730 and output to a display 750 or other rendering device.

In implementation, the coded video buffer 710 and the decoded video buffer 730 may be provided as respective portions of a memory system in the decoder. The processors 720.1-720.3 may be provided as separate processing systems (e.g., separate processor integrated circuits, separate processing cores or separate processing threads in a common integrated circuit).

During operation, the scheduler 740 may assign data of a common coherence group to a single processor (say, processor 720.1) for decoding. The coherence group data may be stored in memory in common areas of the memory system to which the coded video buffer 710 is assigned. Thus, decoding of the coherence group may be performed efficiently because the processor 720.1 may use and reuse a common set of data in the memory space as it performs its decoding operations. When, for example, the coherence group uses common motion vectors, the processor 720.1 may refer to common reference picture data in the memory space to process the coding units in the coherence group. Thus, it is expected that processing of the coherence group will lead to conservation of resources at decoders, particularly for those decoders that include multiple processors.

Figure 8:
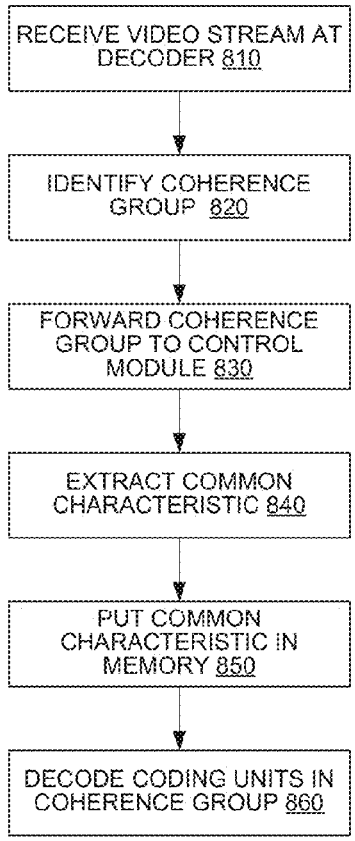
FIG. 8 is a flow diagram illustrating another method according to an embodiment of the present invention.

FIG. 8 is a simplified flow diagram illustrating an exemplary method 800 for decoding a coherence group according to an embodiment of the present invention. In exemplary method 800, a decoder may receive a packet or video stream (block 810). The decoder may then recognize a coherence group with a shared characteristic (block 820).

In one embodiment, a decoder may relay either all video streams, or coherence group streams to a control module (block 830), for manipulation specific to coherence group coded data. For example, a decoder may detect that a group is a coherence group either from a standard format, an SEI Message, or other side information and then forward it to a control module if detected. The control module may then extract the common characteristic for fast memory swapping (block 840). The control module may, for example, put the common characteristic in cache (block 850) or RAM. Additionally, the decoder may permit some of the video data to be reused. In one embodiment, the decoder, using cache or RAM, may keep the common data and decode each coding unit in one coherence group consecutively. The decoder may then read data from the data structure identifying the sequence of coding units and respective locations. The decoder may traverse the data structure, to determine where each coding unit is placed in time as well as location in a frame. The decoder may next decode the coding units, repeatedly using the common characteristic (block 860).

Although primarily described with reference to a video encoding system, the above described methods may be applicable to the capture of video and still images that may directly be stored in a memory system and not coded for compression. Some embodiments may be implemented, for example, using a non-transitory computer-readable storage medium or article which may store an instruction or a set of instructions that, if executed by a processor, may cause the processor to perform a method in accordance with the disclosed embodiments. The exemplary methods and computer program instructions may be embodied on a non-transitory machine readable storage medium. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. The machine readable storage media may include any medium that can store information. Examples of a machine readable storage medium include electronic circuits, semiconductor memory devices, ROM, flash memory, erasable ROM (EROM), floppy diskette, CD-ROM, optical disk, hard disk, fiber optic medium, or any electromagnetic or optical storage device.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A coding method, comprising:
    parsing a source frame into a plurality of coding units,
    coding the coding units according to motion compensated predictive coding,
    searching among the coded coding units for common characteristics,
    assigning select coded coding units to a coherence group according to identified common characteristics,
    transmitting, in a channel, data representing the coherence group that includes:
        a map identifying the coding units that are assigned to the coherence group,
        data representing the common characteristics of the coding units assigned to the coherence group, and
    transmitting, in the channel, remaining data of the coded coding units.

2. The method of claim 1, wherein the common characteristics are omitted from transmitted data of the coded coding units.

3. The method of claim 1, wherein the transmitted data of the coded coding units are coded differentially with respect to the common characteristic data.

4. The method of claim 1, wherein the data of the coded coding units is transmitted in a common syntactic element as the coherence group.

5. The method of claim 1, wherein the data of the coded coding units is transmitted in separate syntactic elements from the coherence group.

6. The method of claim 1, wherein the coherence group includes coding units of a common frame.

7. The method of claim 1, wherein the coherence group includes coding units of a plurality of frames.

8. The method of claim 1, wherein the coherence group includes coding units of a plurality of views of stereoscopic video.

9. The method of claim 1, wherein the coherence group includes coding units of a plurality of coding layers of scalability-coded video.

10. The method of claim 1, wherein the common characteristic is a coding mode type.

11. The method of claim 1, wherein the common characteristic is a motion vector.

12. The method of claim 1, wherein the common characteristic is a quantization parameter.

13. The method of claim 1, wherein the common characteristic is a block size.

14. The method of claim 1, wherein the common characteristic is a filter value.

15. The method of claim 1, wherein the common characteristic is an identification of a facial or non-facial region.

16. A computer readable storage device storing program instructions that, when executed, cause an executing device to perform a method, comprising:
coding units of an input frame according to motion compensated predictive coding,
searching among the coded coding units for common characteristics,
assigning select coded coding units to a coherence group according to identified common characteristics,
transmitting, in a channel, data representing the coherence group that includes:
a map identifying the coding units that are assigned to the coherence group,
data representing the common characteristics of the coding units assigned to the coherence group, and
transmitting, in the channel, remaining data of the coded coding units.

17. The storage device of claim 16, wherein the instructions further cause the executing device to omit the common characteristics from transmitted data of the coded coding units.

18. The storage device of claim 16, wherein the instructions further cause the executing device to transmit data of the coded coding units differentially with respect to the common characteristic data.

19. The storage device of claim 16, wherein the instructions further cause the executing device to transmit the coded coding units in a common syntactic element as the coherence group.

20. The storage device of claim 16, wherein the instructions further cause the executing device to transmit the coded coding units in separate syntactic elements from the coherence group.

21. A video coding system, comprising:
a predictive video coder to code source frames of video having been parsed into coding units,
a transmit buffer to store coded video data prior to transmission, and
a controller, to
search among the coding units for common characteristics,
assign select coded coding units to a coherence group according to identified common characteristics,
transmit, in a channel, data representing the coherence group that includes:
a map identifying the coding units that are assigned to the coherence group,
data representing the common characteristics of the coding units assigned to the coherence group, and
transmit, in the channel, remaining data of the coded coding units.

22. The system of claim 21, wherein the common characteristics are omitted from transmitted data of the coded coding units.

23. The system of claim 21, wherein the transmitted data of the coded coding units are coded differentially with respect to the common characteristic data.

24. The system of claim 21, wherein the data of the coded coding units is transmitted in a common syntactic element as the coherence group.

25. The system of claim 21, wherein the data of the coded coding units is transmitted in separate syntactic elements from the coherence group.

26. The system of claim 21, wherein the coherence group includes coding units of a common frame.

27. The system of claim 21, wherein the coherence group includes coding units of a plurality of frames.

28. The system of claim 21, wherein the coherence group includes coding units of a plurality of views of stereoscopic video.

29. The system of claim 21, wherein the coherence group includes coding units of a plurality of coding layers of scalability-coded video.

30. A decoding method, comprising:
receiving coded video data from a channel, the coded video data including data representing a coherence group and data representing coded coding units,
identifying, from a map contained in the coherence group data, coding units that are assigned to the coherence group,
decoding the coding units according to motion compensated predictive coding using coded data of the respective coding units, wherein, for the coding units assigned to the coherence group, the decoding also is performed using coding data contained in the coherence group; and
assembling a recovered frame from the decoded coding units.

31. The method of claim 30, wherein the coherence group contains data representing common characteristics of the coding units that are assigned to the coherence group, the common characteristic data having been omitted from coded data of the coding units.

32. The method of claim 30, wherein the coherence group contains data representing common characteristics of the coding units that are assigned to the coherence group, and the coded data of the coding units respectively contain data that is coded differentially with respect to the common characteristic data.

33. The method of claim 30, wherein the data of the coded coding units is received, from the channel, in a common syntactic element as the coherence group.

34. The method of claim 30, wherein the data of the coded coding units is received, from the channel, in separate syntactic elements from the coherence group.

35. A computer readable storage device storing program instructions that, when executed, cause an executing device to perform a method, comprising:
- receiving coded video data from a channel, the coded video data including data representing a coherence group and data representing coded coding units,
- identifying, from a map contained in the coherence group data, coding units that are assigned to the coherence group,
- decoding the coding units according to motion compensated predictive coding using coded data of the respective coding units, wherein, for the coding units assigned to the coherence group, the decoding also is performed using coding data contained in the coherence group; and
- assembling a recovered frame from the decoded coding units.

36. A video decoding system, comprising:
- a receive buffer to receive coded video data from a channel, the coded video data including data representing a coherence group and data representing coded coding units,
- a controller, to identify, from a map contained in the coherence group data, coding units that are assigned to the coherence group,
- a predictive video decoder to decode the coding units, using coded data of the respective coding units, wherein, for the coding units assigned to the coherence group, the decoder also decodes the assigned coding units using coding data contained in the coherence group.

37. The video decoding system of claim 36, wherein the predictive video decoder is a parallel processing system and, for the coherence group, a single processor from the parallel processing system decodes the coding units assigned to the coherence group.

* * * * *